United States Patent
Shanmugam et al.

(10) Patent No.: US 11,055,400 B2
(45) Date of Patent: Jul. 6, 2021

(54) MONITORING DATA CONSUMPTION IN AN APPLICATION TESTING ENVIRONMENT

(71) Applicant: BANK OF AMERICA CORPORATION, Charlotte, NC (US)

(72) Inventors: Parthiban T. Shanmugam, Charlotte, NC (US); Bayyareddy Sreenivasulu Reddy, Frisco, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 200 days.

(21) Appl. No.: 16/035,114

(22) Filed: Jul. 13, 2018

(65) Prior Publication Data

US 2020/0019696 A1   Jan. 16, 2020

(51) Int. Cl.
*G06F 21/51*   (2013.01)
*G06F 21/55*   (2013.01)
(Continued)

(52) U.S. Cl.
CPC ............ *G06F 21/51* (2013.01); *G06F 21/554* (2013.01); *G06F 21/6245* (2013.01);
(Continued)

(58) Field of Classification Search
CPC ........ G06F 21/51; G06F 21/554; G06F 21/55; G06F 21/62; G06F 21/6245;
(Continued)

(56) References Cited

U.S. PATENT DOCUMENTS

| 5,557,774 A | 9/1996 | Shimabukuro et al. |
| 5,671,351 A | 9/1997 | Wild et al. |

(Continued)

FOREIGN PATENT DOCUMENTS

EP    1637955 A1 *  3/2006  ............... G06F 1/00

OTHER PUBLICATIONS

Improving Web Application Testing with User Session Data by Sebastian Elbaum, Srikanth Karre and Gregg Rothermel pp. 11; Date Added to IEEE_Xplore: May 28 (Year: 2003).*

(Continued)

*Primary Examiner* — Samson B Lemma
*Assistant Examiner* — Ali H. Cheema
(74) *Attorney, Agent, or Firm* — Michael A. Springs; Moore & Van Allen PLLC; James C. Edwards

(57) ABSTRACT

Embodiments of the present disclosure provide a system, computer program product, and method for monitoring a non-production computing environment to determine the introduction of unexpected data into the non-production computing environment and, in the event that unexpected data is determined to be present, trigger requisite actions to address the concerns, such as notifying, via alert or the like, requisite entities of the unexpected data determining of the cause of the unexpected data in the non-production computing environment, determining whether the unexpected data is valid/acceptable for the non-production, and, if the unexpected data is invalid/unacceptable for the non-production computing environment, determining if un-sanitized data exists in the unexpected data and, if so, sanitize the data.

7 Claims, 3 Drawing Sheets

(51) Int. Cl.
*G06F 21/57* (2013.01)
*G06F 21/62* (2013.01)
*H04L 29/06* (2006.01)

(52) U.S. Cl.
CPC .......... *G06F 21/6281* (2013.01); *G06F 21/55* (2013.01); *G06F 21/57* (2013.01); *H04L 63/0428* (2013.01); *H04L 63/1416* (2013.01); *H04L 63/1441* (2013.01)

(58) Field of Classification Search
CPC ...... G06F 21/6281; G06F 21/57; G06F 17/60; G06F 15/46; G06F 11/3676; G06F 8/71; G05B 23/0229; H04L 67/14; H04L 63/02; H04L 63/1416; H04L 63/0428; H04L 63/029; H04L 63/1441; H04L 63/1475; G06Q 20/4012
USPC .................. 726/26, 14, 1, 23; 717/122, 125; 709/225; 706/20; 705/67
See application file for complete search history.

(56) References Cited

U.S. PATENT DOCUMENTS

| | | | |
|---|---|---|---|
| 6,128,759 | A | 10/2000 | Hansen |
| 6,324,485 | B1 | 11/2001 | Ellis |
| 6,510,402 | B1 | 1/2003 | Logan et al. |
| 6,961,873 | B2 | 11/2005 | Dubovsky |
| 7,317,404 | B2 | 1/2008 | Cumeralto et al. |
| 7,421,621 | B1 | 9/2008 | Zambrana |
| 7,610,578 | B1 | 10/2009 | Taillefer et al. |
| 7,890,951 | B2 | 2/2011 | Vinberg et al. |
| 8,095,124 | B2 | 1/2012 | Balia |
| 8,350,697 | B2 | 1/2013 | Trundle et al. |
| 8,484,568 | B2 | 7/2013 | Rados et al. |
| 8,706,863 | B2 | 4/2014 | Fadell |
| 9,544,256 | B2 * | 1/2017 | Steinberg ................ H04L 51/12 |
| 10,169,315 | B1 * | 1/2019 | Heckel ................... G06F 40/166 |
| 2003/0060189 | A1 | 3/2003 | Minear et al. |
| 2006/0053136 | A1 | 3/2006 | Ashiri |
| 2006/0150159 | A1 | 7/2006 | Fellenstein et al. |
| 2010/0211546 | A1 | 8/2010 | Grohman et al. |
| 2011/0185231 | A1 | 7/2011 | Balestrieri et al. |
| 2012/0272329 | A1 * | 10/2012 | Grammer ............. G06F 21/6245 726/26 |
| 2013/0196649 | A1 | 8/2013 | Paddon et al. |
| 2013/0246621 | A1 * | 9/2013 | Ortiz, Jr. ................. H04L 67/14 709/225 |
| 2013/0247130 | A1 * | 9/2013 | Gupta ..................... G06F 21/57 726/1 |
| 2014/0215623 | A1 * | 7/2014 | Gnanasekar ........ H04L 63/1441 726/23 |
| 2014/0282400 | A1 * | 9/2014 | Moorthi .................... G06F 8/71 717/122 |
| 2015/0067849 | A1 * | 3/2015 | Agrawal ............. H04L 63/1475 726/23 |
| 2015/0215283 | A1 * | 7/2015 | Fischer ................. H04L 63/029 726/14 |
| 2015/0356552 | A1 * | 12/2015 | Thompson ......... G06Q 20/4012 705/67 |
| 2016/0026915 | A1 * | 1/2016 | Delp ................. G05B 23/0229 706/20 |
| 2016/0294851 | A1 * | 10/2016 | Langton .............. H04L 43/0876 |
| 2017/0374027 | A1 * | 12/2017 | Fischer ................ H04L 63/0428 |
| 2018/0024918 | A1 * | 1/2018 | Agarwal ............ G06F 11/3676 717/125 |
| 2018/0082069 | A1 * | 3/2018 | Cunico ................... G06F 21/62 |

OTHER PUBLICATIONS

Leveraging User-Session Data to Support Web Application Testing by Sebastian Elbaum, Gregg Rothermel, Srikanth Karre, and Marc Fisher II p*

* cited by examiner

MONITORING DATA CONSUMPTION IN AN APPLICATION TESTING ENVIRONMENT

FIELD OF THE INVENTION

The present invention is generally directed to computer data processing and, more specifically, monitoring for unexpected data in a non-production computing environment and, in response to determining that unexpected data exists in the non-production computing environment triggering one or more events to remedy the situation.

BACKGROUND

In large enterprises, use of computing applications must undergo rigorous development and testing before the applications are released into production. Such testing is not only required at the inception of the computing application but may also be required when the computing application undergoes a significant update/revision.

In the production computing environment the data that is processed by the applications may include data that is deemed to be non-public information (NPI), confidential, private or the like. As such, in the production computing environment proper safeguards are implemented to insure that the NPI, confidential data, private data or the like is not susceptible to a data breach. In lower level non-production computing environments, such as development and test computing environments, the data that is processed is typically sanitized, meaning that non-public information (NPI), confidential data, private data or the like is removed or otherwise obfuscated from the data file, so as to eliminate or lessen the need to implement safeguards against a data breach. In addition, in non-production computing environments the amount of data that is used for testing an application typically remains consistent or gradually increases the closer the application gets to production use. Therefore, a problem may be evident if a large increase in the amount of data is unexpectedly introduced into a non-production computing environment. Specifically, a concern arises that such an unexpected increase in test data may include un-sanitized production data.

Therefore, a need exists to insure that un-sanitized data (i.e., data that may include NPI, private or confidential data or the like) is not introduced into a non-production computing environment, such as development or test environment. In this regard, a need exists to determine if unexpected data, otherwise referred to as "bulk" data has been or is being introduced into the non-production computing environment and, if so, trigger events to address the concerns over introducing unexpected data in the non-production computing environment.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, methods, computer program product and/or the like for monitoring a non-production computing environment to determine the introduction of unexpected data into the non-production computing environment and, in the event that unexpected data is determined to be present, trigger requisite actions to address the concerns.

The systems, methods, computer program products herein described are highly configurable in terms of (i) monitoring parameters that define the criteria for monitoring the data introduced into the non-production computing environment are configurable, and (ii) conditions that define the boundaries of unexpected data. In specific embodiments of the invention, the monitoring parameters may include, but are not limited to, the time period over which monitoring occurs (e.g., hourly, daily, weekly, monthly or the like) or, in other instances, whether the monitoring and determination is to occur in real-time and the like. The time period for monitoring may be based on the complexity of the application, the sensitivity of the data used in the production environment and the like. The conditions that define unexpected data may include, but are not limited to, a threshold for a volume increase of data over the aforementioned time period for monitoring or a threshold for a percentage increase of data over the aforementioned time period for monitoring.

In the event that unexpected/bulk data is determined to be present in the non-production computing environment the automated actions that may be triggered include, but are not limited to, generating and initiating communication of an alert to predetermined entities, determining of the cause of the unexpected data in the non-production computing environment, determining whether the unexpected data is valid/acceptable for the non-production, and, if the unexpected data is invalid/unacceptable for the non-production computing environment, determining if un-sanitized data exists in the unexpected data and, if so, sanitize the data.

A system for monitoring for an introduction of unexpected data in a non-production computing environment defines first embodiments of the invention. The system includes a non-production computing environment disposed in a distributed computing network and configured to execute at least one application in a non-production mode (e.g., development, testing or the like). The system additionally includes a computing platform disposed in a distributed computing network and including a memory and at least one processor in communication with the memory. In addition, the system includes a data monitoring module that is stored in the memory and executable by the at least one processor. The data monitoring module includes a monitoring configuration tool configured to receive (i) one or more monitoring parameters that define criteria for monitoring data introduced into the non-production computing environment, and (ii) one or more conditions that define unexpected data. The module additionally includes a monitoring tool configured to monitor data introduced into the non-production computing environment in accordance with the one or more monitoring parameters and determine, based on the monitoring of the data and the one or more conditions, that unexpected data has been or is being introduced into the non-production computing environment. Further, the monitoring tool is configured to, in response to determining that the unexpected data has been or is being introduced into the non-production computing environment, generate and initiate electronic communication of an alert to one or more predetermined entities. The alert is configured to notify the one or more predetermined entities of the unexpected data in the non-production computing environment.

In specific embodiments of the system, the one or more monitoring parameters include a period of time for monitoring or real-time monitoring and the one or more conditions include a first threshold for a volume increase of data for the period of time for monitoring or a second threshold for a percentage increase of data for the period of time for monitoring. The period of time for monitoring may be based on at least one of (i) a complexity of the at least one application executed in the non-production computing environment, and (ii) security requirements of the data introduced into the non-production computing environment.

In other specific embodiments the system includes a data validation module stored in the memory, executable by the at least one processor and configured to determine whether the unexpected data is a valid or invalid introduction of data into the non-production computing environment. In such embodiments the system may further include a data sanitization module stored in the memory, executable by the processor and configured to, in response to the data validation module determining that the unexpected data is a valid introduction of data into the non-production computing environment, insure that the unexpected data does not include at least one of Non-Public Information (NPI) confidential data and private data. In still further specific embodiments the system includes a data source determining module stored in the memory, executable by the processor and configured to, in response to the data validation module determining that the unexpected data is an invalid introduction of data into the non-production computing environment, determine at least one of (i) a source of the unexpected data, and (ii) a manner in which the unexpected data was introduced into the non-production computing environment.

In further specific embodiments of the system, the monitoring tool is further configured to monitor the data introduced into the non-production computing environment and determine, in real-time to the monitoring, that unexpected data has been or is being introduced into the non-production computing environment. In still further specific embodiments the data monitoring module further includes a data tracking tool configured to track and store in the memory (i) a date and time of for an occurrence of unexpected data introduced into the non-production computing environment, and (ii) a volume of data in the occurrence.

A computer-implemented method for monitoring for an introduction of unexpected data in a non-production computing environment defines second embodiments of the invention. The computer-implemented method is implemented by one or more processing devices. The method includes receiving (i) one or more monitoring parameters that define criteria for monitoring data introduced into a non-production computing environment, and (ii) one or more conditions that define unexpected data. In addition the method includes monitoring data introduced into the non-production computing environment in accordance with the one or more monitoring parameters, and determining, based on the monitoring and one or more conditions, that unexpected data has been or is being introduced into the non-production computing environment. The method further includes, in response to determining that the unexpected data has been or is being introduced into the non-production computing environment, generating and initiating electronic communication of an alert to one or more predetermined entities. The alert is configured to notify the one or more predetermined entities of the unexpected data in the non-production computing environment.

In specific embodiments of the method, the one or more monitoring parameters including one of a period of time for monitoring or real-time monitoring, and the one or more conditions including one of a first threshold for volume increase of data for the period of time for monitoring or a second threshold for a percentage increase of data over the period of time for monitoring. The period of time for monitoring may be based on at least one of (i) a complexity of the at least one application executed in the non-production computing environment, and (ii) security requirements of the data introduced into the non-production computing environment.

In further specific embodiments the method includes determining whether the unexpected data is a valid or an invalid introduction of data into the non-production computing environment. In such embodiments the method may further include, in response to determining that the unexpected data is a valid introduction of data into the non-production computing environment, insuring that the unexpected data does not include confidential data and private data. In other specific embodiments the method may further include, in response to determining that the unexpected data is an invalid introduction of data into the non-production computing environment, determining at least one of (i) a source of the unexpected data, and (ii) a manner in which the unexpected data was introduced into the non-production computing environment.

In other specific embodiments of the method, determining further includes determining, in real-time to the monitoring, that unexpected data has been or is being introduced into the non-production computing environment. In other specific embodiments the method includes tracking and storing in computing device memory (i) a date and time of for an occurrence of unexpected data introduced into the non-production computing environment, and (ii) a volume of data of the occurrence.

A computer program product including a non-transitory computer-readable medium defines third embodiments of the invention. The computer-readable medium includes a first set of codes for causing a computer to receive (i) one or more monitoring parameters that define criteria for monitoring data introduced into a non-production computing environment, and (ii) one or more conditions that define unexpected data. Additionally, the computer-readable medium includes a second set of codes for causing a computer to monitor data introduced into the non-production computing environment in accordance with the one or more monitoring parameters and a third set of codes for causing a computer to determine, based on the monitoring and one or more conditions, that unexpected data has been or is being introduced into the non-production computing environment. In addition, the computer-readable medium includes a fourth set of codes for causing a computer, in response to determining that the unexpected data has been or is being introduced into the non-production computing environment, generate and initiate electronic communication of an alert to one or more predetermined entities. The alert is configured to notify the one or more predetermined entities of the unexpected data in the non-production computing environment.

In specific embodiments of the computer program product the one or more monitoring parameters include a period of time for monitoring or real-time monitoring, and (ii) the one or more conditions include a first threshold for volume increase of data for the period of time for monitoring or a second threshold for a percentage increase of data for the period of time for monitoring.

Thus, according to embodiments of the invention, which will be discussed in greater detail below, the present invention provides for monitoring a non-production computing environment to determine the introduction of unexpected data into the non-production computing environment and, in the event that unexpected data is determined to be present, trigger requisite actions to address the concerns, such as notifying, via alert or the like, requisite entities of the unexpected data determining of the cause of the unexpected data in the non-production computing environment, determining whether the unexpected data is valid/acceptable for the non-production, and, if the unexpected data is invalid/unacceptable for the non-production computing environment, determining if un-sanitized data exists in the unexpected data and, if so, sanitize the data.

The features, functions, and advantages that have been discussed may be achieved independently in various embodiments of the present invention or may be combined with yet other embodiments, further details of which can be seen with reference to the following description and drawings.

INCORPORATION BY REFERENCE

To supplement the present disclosure, this application further incorporates entirely by reference the following commonly assigned patent applications:

| Docket Number | U.S. patent application Ser. No. | Title | Filed On |
| --- | --- | --- | --- |
| 8484US1.014033.3240 | 16/035,064 | INTEGRATED DATA PROVISIONING SYSTEM FOR APPLICATION DEVELOPMENT | Jul. 13, 2018 |
| 8485US1.014033.3241 | 16/035,077 | HOLISTIC AND SECURE RESOURCE PROVISIONING GATEWAY SYSTEM | Jul. 13, 2018 |
| 8488US1.014033.3243 | 16/035,345 | SYSTEM FOR MONITORING LOWER LEVEL ENVIRONMENT FOR UNSANITIZED DATA | Jul. 13, 2018 |
| 8489US1.014033.3244 | 16/035,162 | SYSTEM FOR PROVISIONING VALIDATED SANITIZED DATA FOR APPLICATION DEVELOPMENT | Jul. 13, 2018 |

BRIEF DESCRIPTION OF THE DRAWINGS

Figure 1:
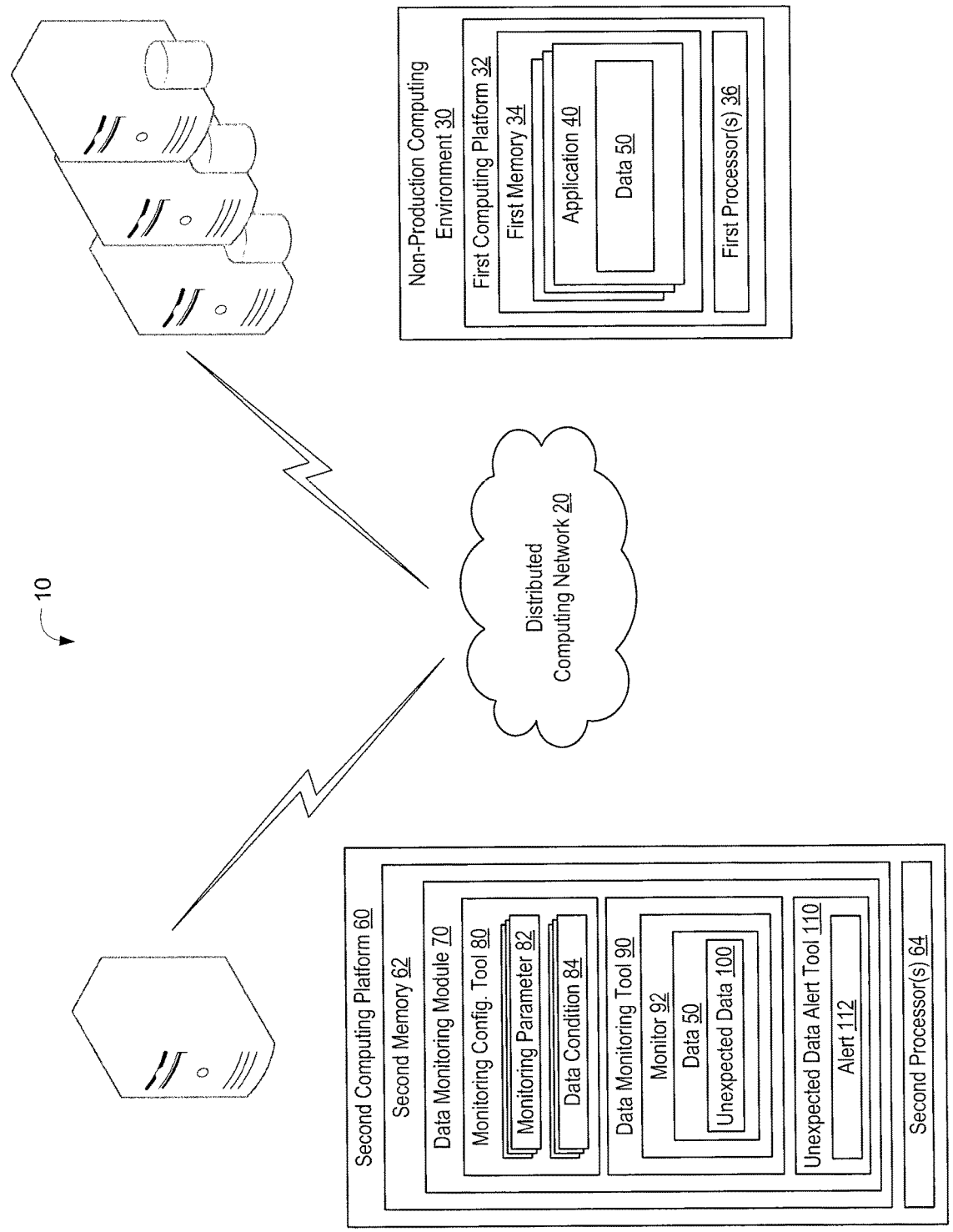
Figure 2:
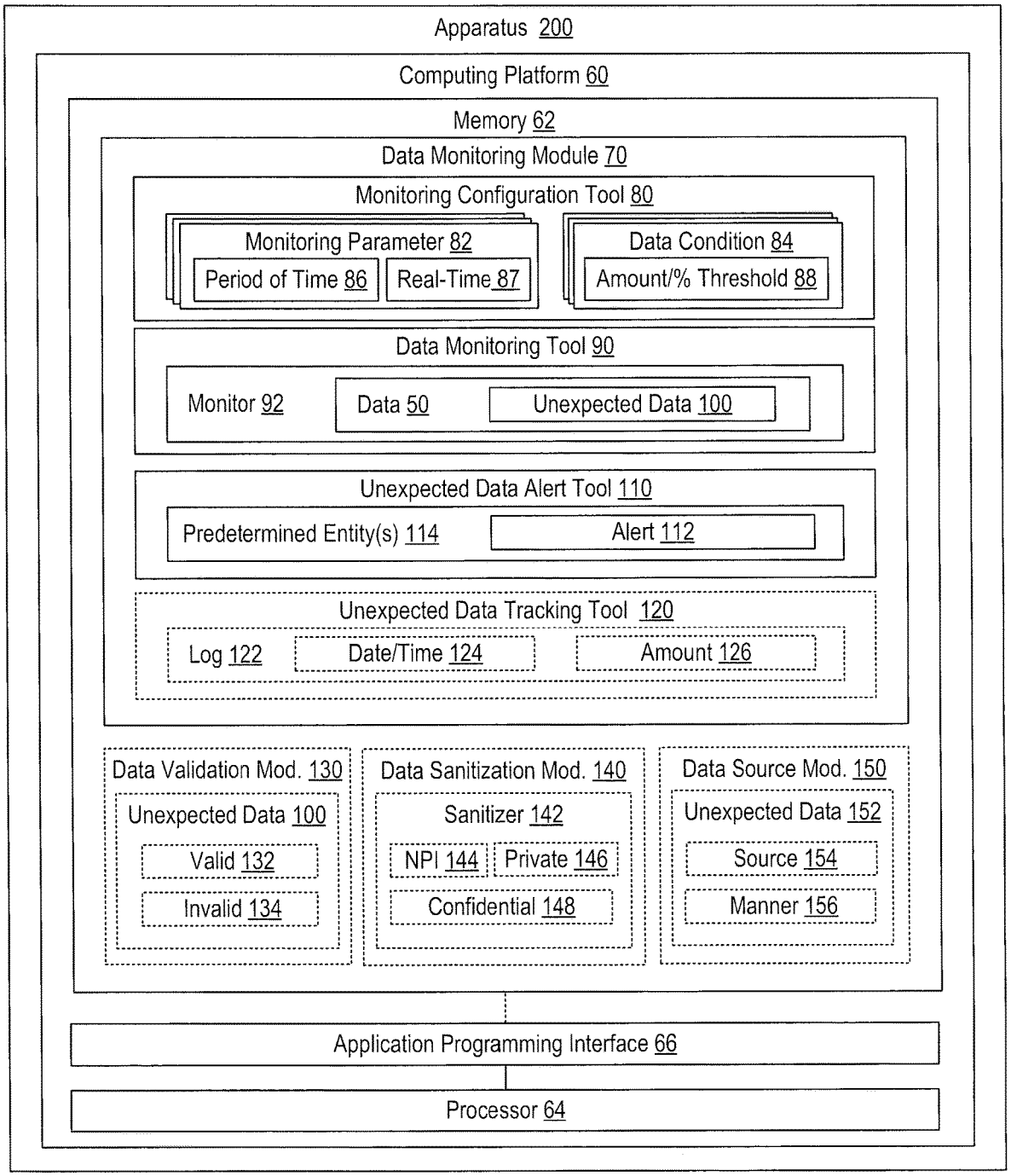
Figure 3:
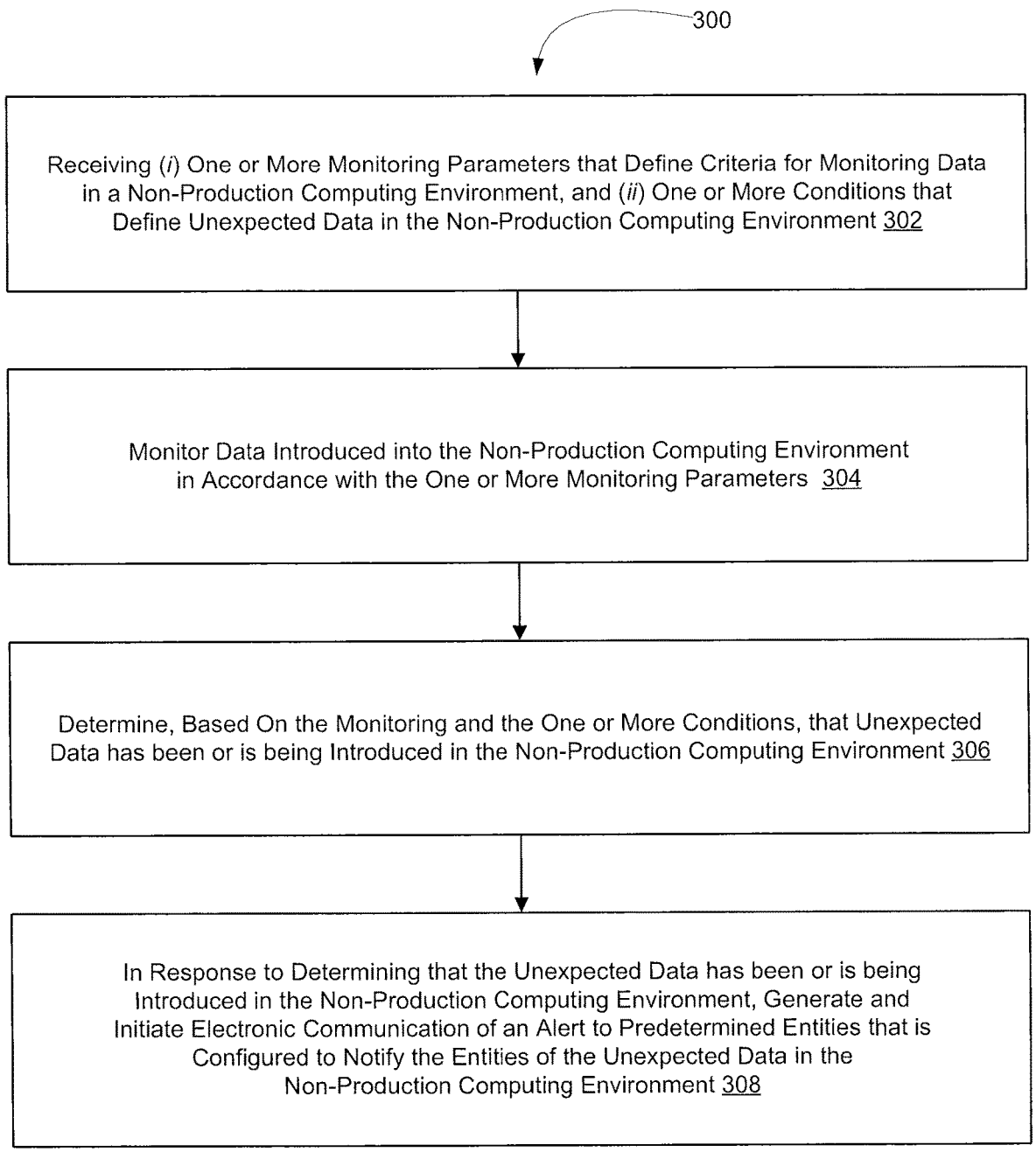

Having thus described embodiments of the disclosure in general terms, reference will now be made to the accompanying drawings, wherein:

FIG. 1 is a schematic diagram of a system for monitoring a non-production computing environment to determine the insertion of unexpected data therein, in accordance with some embodiments of the present disclosure;

FIG. 2 is a block diagram of an apparatus configured for monitoring a non-production computing environment to determine the insertion of unexpected data therein, in accordance with some embodiments of the present disclosure; and FIG. 3 is a flow diagram of a method of monitoring a non-production computing environment to determine the insertion of unexpected data therein, in accordance with some embodiments of the present disclosure

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, apparatus, methods and computer program products are disclosed for monitoring a non-production computing environment (e.g., testing, development or the like to determine the introduction of unexpected data, otherwise referred to herein as "bulk data", into the non-production computing environment and, in the event that unexpected data is determined to be present, trigger requisite actions to address the concerns.

The systems, methods, computer program products herein described are highly configurable in terms of (i) monitoring parameters that define the criteria for monitoring the data introduced into the non-production computing environment are configurable, and (ii) conditions that define the boundaries of unexpected data. In specific embodiments of the invention, the monitoring parameters may include, but are not limited to, the time period over which monitoring occurs (e.g., hourly, daily, weekly, monthly or the like) or, in other instances, whether the monitoring and determination is to occur in real-time or the like. The time period for monitoring may be based on the complexity of the application, the sensitivity of the data used in the production environment and the like. The conditions that define unexpected data may include, but are not limited to, a threshold for a volume increase of data over the aforementioned time period for monitoring or a threshold for a percentage increase of data over the aforementioned time period for monitoring.

In the event that unexpected/bulk data is determined to be present in the non-production computing environment the automated actions that may be triggered include generating and initiating communication of an alert to predetermined entities, such as a governance entity or the like. Other actions that may be triggered include, but are not limited to, determining the cause of the unexpected data in the non-production computing environment, determining whether the unexpected data is valid/acceptable for the non-production, and, if the unexpected data is invalid/unacceptable for the non-production computing environment, determining if un-sanitized data exists in the unexpected data and, if so, sanitizing the data.

Turning now to the figures, FIG. 1 is a block diagram of a system 10 for monitoring a non-production computing environment for unexpected data, in accordance with embodiments of the present invention. The system 10 includes a non-production computing environment 30, which is disposed within a distributed computing network 20. The distributed computing network 20 may comprise an intranet (e.g., enterprise internal computing network), and/or the Internet or any other known or future known computing network.

The non-production computing environment 30 may be a test computing environment, a development computing environment or any other lower-level (i.e., below production level) computing environment. The non-production computing environment 30 includes a first computing platform 32 having a first memory 34 and at least one first processor 36 in communication with the memory 34. The first computing platform may comprise one or more computing apparatus/devices, such as one or more servers or the like. First memory 34 of first computing platform 32 stores one or more applications 40 that executable via first processor(s) 36. The term "application" as used here includes any executable computer-readable instructions, such as modules, tools, routines, algorithms or the like. Application(s) 40 are configured to receive and process data 50. In non-production computing environments 30, such as test or development computing environment, the data 50 is typically configured as test or development data, otherwise referred to as "dummy data", meaning that the data has been sanitized for test or development use. Sanitization means that certain data elements (e.g., non-public information (NPI) or data deemed to be confidential or private) are removed from the data or otherwise obfuscated, encrypted, changed or the like, so as to eliminate or lessen the likelihood of public exposure of the secure data elements. As such, the data 50 used in the non-production computing environment is in contrast to production data, otherwise referred to as "live data", which, depending on the use case, may include such secure data elements (e.g., non-public information (NPI) or data deemed to be confidential or private).

The system 10 additionally includes a second computing platform 60 in communication with the non-production computing environment 30 via distributed computing network 20. The second computing platform, which may include one or more computing apparatus/devices, such as servers or the like, includes a second memory 62 in communication with at least one second processor 64. It should be noted that while FIG. 1 shows first computing platform 32 and second computing platform 32 comprising separate computing apparatus/devices, in other embodiments of the invention, first computing platform 32 and second computing platform 60 may comprise one or more of the same apparatus/devices (e.g., the data monitoring module 80 may be executed on a different apparatus/device(s) than the apparatus/devices that execute the test/development application(s) 40 or, in other embodiments of the invention, the data monitoring module 80 may be executed on the same apparatus/device(s) that execute the test/development application(s) 40).

The second memory 62 of second computing platform 60 stores data monitoring module 70 which is configured to monitor the non-production computing environment 30 for unexpected data 100, in accordance with embodiments of the present invention. Unexpected data 100, otherwise referred to as "bulk data" is any data introduced in the non-production computing environment 30 which deviates from the norm.

Data monitoring module 70 includes data monitoring configuration tool 80, which is configured to receive (i) one or more monitoring parameters 82 that define criteria for monitoring data 50 introduced into the non-production computing environment 30 and (ii) one or more conditions 84 that define the unexpected data 100. In specific embodiments of the invention, the data monitoring configuration tool 80 is configured to include one or more graphical user interfaces (GUIs) (not shown in FIG. 1) that are presented to a user and allow for the user the input the (i) one or more monitoring parameters 82 and/or (ii) one or more conditions 84. In specific embodiments of the invention, the monitoring parameter(s) 82 may include, but are not limited to the time period for monitoring (e.g., hourly, daily, weekly, monthly or the like) or a designation for real-time monitoring, and the one or more conditions 84 may include, but are not limited to a threshold for increases in amount of data or percentage increases in the amount of data over the time period for monitoring.

Data monitoring module 70 additionally includes data monitoring tool 90 that is configured to monitor 92 the data 50 introduced into the non-production computing environment 30 in accordance with the one or more monitoring parameters 82. Further, data monitoring tool 90 is configured to determine, based on the monitoring and the one or more conditions 84, that unexpected data 100 has been or is being introduced into the non-production computing environment 30. For example, if the time period for monitoring has been set at a week, after the week time period a determination may be made as whether or not the defined threshold amount of data or percentage increase in data has been exceeded during the preceding week. If the threshold amount of data or percentage increase in data has been exceeded (or, in some embodiments, met) the data introduced is considered to be unexpected data (e.g., a comparison is made between the amount of data 50 in the non-production computing environment 30 at the beginning of the week and the amount of data 50 in the non-production computing environment 30 at the end of the week and, if the threshold amount of data or percentage increase in data has been exceeded, the data introduced into the non-production computing environment 30 is deemed to be unexpected data 100).

Data monitoring module 70 additionally includes unexpected data alert tool 110 this is configured to, in response to determining that unexpected data 100 has been or is being introduced into the non-production computing environment 30, generate and initiate electronic communication of an alert 112 to one or more predetermined entities that notifies the entities of the unexpected data in the non-production computing environment 30. As will be discussed in relation to FIG. 2, the determination that unexpected data 100 has been or is being introduced into the non-production computing environment 30 may trigger other automated actions, such as but not limited to, determine if the unexpected data is valid, insuring that valid data is sanitized, eliminating invalid data, determining the cause of the unexpected data including the source and the manner in which the unexpected data was or is being introduced.

Referring to FIG. 2, a block diagram is depicted of an apparatus 200 configured for monitoring non-production computing environments 30 for introduction of unexpected "bulk" data 100, in accordance with embodiments of the present invention. The apparatus 700 includes a computing platform 60 that can execute algorithms, such as modules, routines, applications and the like. Computing platform 60 includes memory 62, which may comprise volatile and non-volatile memory, such as read-only and/or random-access memory (RAM and ROM), EPROM, EEPROM, flash cards, or any memory common to computer platforms). Moreover, memory 4062 may comprise cloud storage, such as provided by a cloud storage service and/or a cloud connection service.

Further, computing platform 60 also includes processor 64, which may be an application-specific integrated circuit ("ASIC"), or other chipset, logic circuit, or other data processing device. Processor 64 may execute one or more application programming interface (APIs) 66 that interfaces with any resident programs, such as data monitoring module 70 or, optionally, data validation module 130, data sanitization module 140, data source module 150 or the like stored in the memory 62 of the computing platform 60 and any external programs, such as applications 40 (shown in FIG. 1). Processor 64 may include various processing subsystems (not shown in FIG. 2) embodied in hardware, firmware, software, and combinations thereof, that enable the functionality of apparatus 200 and the operability of the apparatus 200 on the distributed computing network 20. For example, processing subsystems allow for initiating and maintaining communications and exchanging data with other networked devices. For the disclosed aspects, processing subsystems of processor 64 may include any subsystem used in conjunction with data monitoring module 70 and related tools, routines, sub-routines, algorithms, sub-algorithms, sub-modules thereof.

Computer platform 60 may additionally include a communications module (not shown in FIG. 2) embodied in hardware, firmware, software, and combinations thereof, that enables electronic communications between the apparatus 200 and other network devices, such as those shown in FIG. 1. Thus, communication module may include the requisite hardware, firmware, software and/or combinations thereof for establishing and maintaining a network communication connection.

Memory 62 of computing platform 60 stores data monitoring module 70 configured to monitor the non-production computing environment 30 for unexpected data 100, in accordance with embodiments of the present invention.

Data monitoring module 70 includes data monitoring configuration tool 80, which is configured to receive (i) one or more monitoring parameters 82 that define criteria for monitoring data 50 introduced into the non-production computing environment 30 and (ii) one or more conditions 84 that define the unexpected data 100. As previously discussed, in specific embodiments of the invention, the data monitoring configuration tool 80 is configured to include one or more graphical user interfaces (GUIs) (not shown in FIG. 2) that are presented to a user and allow for the user the input the (i) one or more monitoring parameters 82 and/or (ii) one or more conditions 84. The monitoring parameter(s) 82 may include, but are not limited to the time period for monitoring 86 (e.g., hourly, daily, weekly, monthly or the like) or a designation for real-time monitoring 87, and the one or more conditions 84 may include, but are not limited to a threshold 88 for increases in amount of data (e.g., quantity of bytes, number of files or the like) or percentage increases in the amount of data over the time period for monitoring 88 or the threshold amount of data when real-time monitoring is occurring. In specific embodiments of the invention, the monitoring parameters 82 may be based on the complexity of the application(s) 40 being monitored in the non-production computing environment 30 and/or (the security requirements surrounding the data entries in the data processed by the applications 40.

Data monitoring module 70 additionally includes data monitoring tool 90 that is configured to monitor 92 the data 50 introduced into the non-production computing environment 30 in accordance with the one or more monitoring parameters 82. Further, data monitoring tool 90 is configured to determine, based on the monitoring and the one or more conditions 84, that unexpected data 100 has been or is being introduced into the non-production computing environment 30. For example, if the time period for monitoring has been set at a week, after the week time period a determination may be made as whether or not the defined threshold amount of data or percentage increase in data has been exceeded during the preceding week. If the threshold amount of data or percentage increase in data has been exceeded (or, in some embodiments, met) the data introduced is considered to be unexpected data (e.g., a comparison is made between the amount of data 50 in the non-production computing environment 30 at the beginning of the week and the amount of data 50 in the non-production computing environment 30 at the end of the week and, if the threshold amount of data or percentage increase in data has been exceeded, the data introduced into the non-production computing environment 30 is deemed to be unexpected data 100). In other embodiments of the invention, in which monitoring results in a real-time determination of unexpected data, the amount of data introduced may exceed an allowable amount threshold, the rate at which data is being introduced may exceed an allowable rate threshold or the like.

Data monitoring module 70 additionally includes unexpected data alert tool 110 this is configured to, in response to determining that unexpected data 100 has been or is being introduced into the non-production computing environment 30, generate and initiate electronic communication of an alert 112 to one or more predetermined entities 114 (e.g., governance entity or the like) that notifies the entities 114 of the unexpected data in the non-production computing environment 30. In addition to notifying of the occurrence, the alert may include the amount of unexpected data, time/data of introduction of unexpected data, source of unexpected data, manner in which unexpected was or is being introduced or the like.

Further, in optional embodiments of the invention, the data monitoring module 70 includes unexpected data tracking tool 120 that is configured to track and log 122 the introduction of unexpected data 100 into the non-production computing environment 30. The log 100 may include, but is not limited to the date/time 124 of the occurrence of unexpected data being introduced into the non-production computing environment, the amount of data 126 (e.g., bytes, quantity of files) in the occurrence, the monitoring parameters and/or conditions that define unexpected data and the like.

Memory 62 of computing platform 60 may additionally include other modules that are triggered in response to determining unexpected data 100 in the non-production environment 30, in accordance with optional embodiments of the invention. The other modules may include data validation module 130 that is configured to determine whether the unexpected data 100 is valid data 132 (acceptable for processing in the non-production computing environment 30) or invalid data 134 (unacceptable for processing in the non-production computing environment). One example of invalid data 134 may be production data that has been erroneously introduced into the non-production computing environment (e.g., testing computing environment or the like) or the like. Data validation may entail scanning the data to determine the data entries and/or determining the source of the data or the manner in which the data was or is being introduced into the non-production computing environment.

In addition, the other modules may include data sanitization module 140 that is configured, in response to the data validation module 130 determining that the unexpected data is valid or in some embodiments invalid, insure that the data is sanitized. In this regard, the module 130 may implement sanitizer 142, which is configured to remove and/or obfuscate/change data that is unauthorized for the non-production computing environment, such as, but not limited to, NP1 144, private data 146, confidential data 148 or the like.

Additionally, the other modules may include unexpected data investigative/source module 150 that is configured, investigate the unexpected data 100 to determine a source 154 of the unexpected data and/or the manner 156 in which the unexpected data was or is being introduced into the non-production computing system 30. The unexpected data investigative/source module 150 may be implemented on all unexpected data 100 or unexpected data 100 determined to be valid and/or invalid.

Referring to FIG. 3 a flow diagram is presented of a method 300 for monitoring non-production computing environments for unexpected data introduction, in accordance with embodiments of the present invention. At Event 302, (i) one or more monitoring parameters that define criteria for monitoring data introduced into the non-production computing environment and (ii) one or more conditions that define the unexpected data are received. In specific embodiments of the method, the monitoring parameters and the conditions are received via one or more GUIs that presented to a user and allow for the user to configure the monitoring parameter(s) and the condition(s) that define unexpected data. The monitoring parameter(s) may include, but are not limited to the time period for monitoring (e.g., hourly, daily, weekly, monthly or the like) or a designation for real-time monitoring and the condition(s) may include, but are not limited to a threshold for increases in amount of data (e.g., quantity of bytes, number of files or the like) or percentage increases in the amount of data over the time period for monitoring or the threshold amount of data when real-time monitoring has been designated.

At Event 304, the data introduced/inputted into the non-production computing environment is monitored in accordance with the one or more monitoring parameters. For example, the data introduced may be monitored for the configured time period (e.g., hour, day, week, month or the like) or may be monitored in real-time. At Event 306, based on the monitoring and the defined condition(s), a determination is made that unexpected data has been (e.g., over a predefined time period) or is being (e.g., real-time monitoring) introduced in to the non-production computing environment. In this regard, a determination may be made that the threshold amount of data (or percentage increase) introduced into the non-production computing environment has been met or exceeded for the defined time period or an amount or rate of data introduced into the non-production computing environment is being met or exceeded for real-time monitoring.

At Event 308, one or more actions are triggered in response to determining that unexpected data has been or is being introduced into the non-production computing environment. Specifically, an alert is generated and electronic communication is initiated to one or more predetermined entities (e.g., governance entity or the like) that notifies the entity of the introduction of unexpected data into the non-production computing environment. The alert may include other information pertaining to the monitoring (e.g., parameters, conditions), the introduction/input of the unexpected data (e.g., date/time, amount or the like) or the like.

Thus, present embodiments of the invention provide for monitoring a non-production computing environment to determine the introduction of unexpected data into the non-production computing environment and, in the event that unexpected data is determined to be present, trigger requisite actions to address the concerns, such as notifying, via alert or the like, requisite entities of the unexpected data determining of the cause of the unexpected data in the non-production computing environment, determining whether the unexpected data is valid/acceptable for the non-production, and, if the unexpected data is invalid/unacceptable for the non-production computing environment, determining if un-sanitized data exists in the unexpected data and, if so, sanitize the data.

As such, the present invention provides for readily identifying unexpected/bulk data insertions in a non-production computing environment, notifying predetermined entities of such and, if the unexpected data is determined to be unintended for the non-production environment, removing the data from the environment or otherwise insuring that the data is suitable for the non-production computing environment.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for monitoring for an introduction of unexpected data in a testing computing environment, the system comprising:

the testing computing environment disposed in a distributed computing network and configured to execute at least one application in a testing mode prior to releasing the application to a production computing environment;

a computing platform disposed in the distributed computing network and including a memory and at least one processor in communication with the memory;

a data monitoring module stored in the memory of the computing platform, executable by the at least one processor and including:

a monitoring configuration tool configured to receive (i) one or more monitoring parameters that define a period of time for monitoring data introduced into the testing computing environment, and (ii) one or more conditions that define unexpected data, wherein the conditions include one of a first threshold for a volume of data received during the period of time or a second threshold for a percentage increase of data received during the period of time in comparison to a previous same period of time;

a data monitoring tool configured to:

monitor data introduced into the testing computing environment in accordance with the one or more monitoring parameters, and determine, based on the monitoring of the data, that unexpected data has been or is being introduced into the testing computing environment based on the first threshold or the second threshold having been exceeded; and an unexpected data alert tool configured to:

in response to determining that the unexpected data has been or is being introduced into the testing computing environment, generate and initiate electronic communication of an alert to one or more predetermined entities, wherein the alert is configured to notify the one or more predetermined entities of the unexpected data in the testing computing environment; and a data validation module stored in the memory, executable by the at least one processor and configured to:

determine whether the unexpected data is a valid or invalid introduction of data into the testing computing environment;

a data sanitization module stored in the memory, executable by the processor and configured to, in response to the data validation module determining that the unexpected data is a valid introduction of data into the testing computing environment, check for Non-Public Information (NPI), confidential data and private data in the unexpected data and replace or obfuscate the NPI, confidential and private data from the unexpected data; and a data source determining module stored in the memory, executable by the processor and configured to, in response to the data validation module determining that the unexpected data is an invalid introduction of data into the testing computing environment, determine at least one of (i) a source of the unexpected data, and (ii) a manner in which the unexpected data was introduced into the testing computing environment.

2. The system of claim 1, wherein the data monitoring tool is further configured to monitor the data introduced into the testing computing environment and determine, in real-time to the monitoring, that unexpected data is being introduced into the testing computing environment.

3. The system of claim 1, wherein the data monitoring module further includes a data tracking tool configured to track and store in the memory (i) a date and time of for an occurrence of unexpected data introduced into the testing computing environment, and (ii) a volume of data in the occurrence.

4. A computer-implemented method for monitoring for an introduction of unexpected data in a testing computing environment, the computer-implemented method is implemented by one or more processing devices and comprising:
   receiving (i) one or more monitoring parameters that define a period of time for monitoring data introduced into the testing computing environment, and (ii) one or more conditions that define unexpected data, wherein the conditions include one of a first threshold fora volume of data received during the period of time or a second threshold for a percentage increase of data received during the period of time in comparison to a previous same period of time;
   monitoring data introduced into the testing computing environment in accordance with the one or more monitoring parameters;
   determining, based on the monitoring, that unexpected data has been or is being introduced into the testing computing environment based on the first threshold or the second threshold having been exceeded;
   in response to determining that the unexpected data has been or is being introduced into the testing computing environment,
      (i) generating and initiating electronic communication of an alert to one or more predetermined entities, wherein the alert is configured to notify the one or more predetermined entities of the unexpected data in the testing computing environment;
      (ii) determining whether the unexpected data is a valid or invalid introduction of data into the testing computing environment; and
      (iii) in response to determining that the unexpected data is a valid introduction of data into the testing computing environment, checking for Non-Public Information (NPI), confidential data and private data in the unexpected data and replacing or obfuscating the NPI, confidential and private data from the unexpected data; and
      (iv) in response to determining that the unexpected data is an invalid introduction of data into the testing computing environment, determining at least one of (i) a source of the unexpected data, and (ii) a manner in which the unexpected data was introduced into the testing computing environment.

5. The computer-implemented method of claim 4, wherein determining further comprises determining, in real-time to the monitoring, that unexpected data is being introduced into the testing computing environment.

6. The computer-implemented method of claim 4, further comprising tracking and storing in computing device memory (i) a date and time of for an occurrence of unexpected data introduced into the testing computing environment, and (ii) a volume of data of the occurrence.

7. A computer program product including a non-transitory computer-readable medium, the non-transitory computer-readable medium comprising:
   a first set of codes for receiving (i) one or more monitoring parameters that define a period of time for monitoring data introduced into a testing computing environment, and (ii) one or more conditions that define unexpected data, wherein the conditions include one of a first threshold for a volume of data received during the period of time or a second threshold for a percentage increase of data received during the period of time in comparison to a previous same period of time;
   a second set of codes for monitoring data introduced into the testing computing environment in accordance with the one or more monitoring parameters;
   a third set of codes for determining, based on the monitoring, that unexpected data has been or is being introduced into the testing computing environment based on the first threshold or the second threshold having been exceeded; and
   a fourth set of codes for, in response to determining that the unexpected data has been or is being introduced into the testing computing environment, (i) generating and initiating electronic communication of an alert to one or more predetermined entities, wherein the alert is configured to notify the one or more predetermined entities of the unexpected data in the testing computing environment, (ii) determining whether the unexpected data is a valid or invalid introduction of data into the testing computing environment, (iii) in response to determining that the unexpected data is a valid introduction of data into the testing computing environment, checking for Non-Public Information (NPI), confidential data and private data in the unexpected data and replace or obfuscate the NPI, confidential and private data from the unexpected data, and (iv) in response to determining that the unexpected data is an invalid introduction of data into the testing computing environment, determining at least one of (i) a source of the unexpected data, and (ii) a manner in which the unexpected data was introduced into the testing computing environment.

* * * * *